INVENTORS
George F. Ritter, Jr.,
Frank J. Carson and
Frank J. Hymore
BY
Nobbe & Collins
ATTORNEYS INVENTORS
George F. Ritter, Jr.,
Frank J. Carson and
Frank J. Hymore
BY Nobbe & Collins
ATTORNEYS United States Patent Office 3,476,540
Patented Nov. 4, 1969

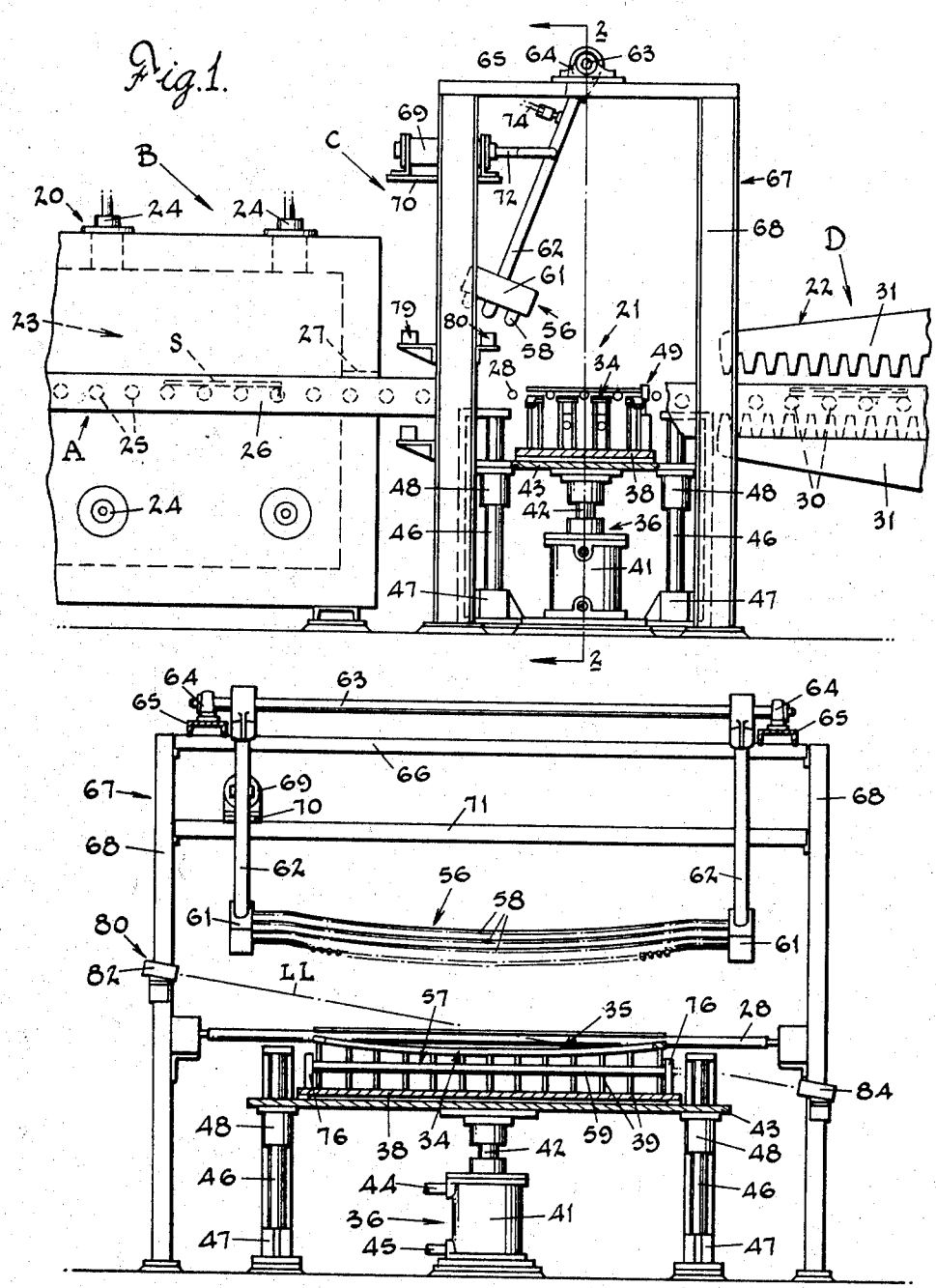

3,476,540
METHOD OF BENDING GLASS SHEETS
George F. Ritter, Jr., and Frank J. Carson, Toledo, and Frank J. Hymore, Oregon, Ohio, assignors to Libbey-Owens-Ford Company, Toledo, Ohio, a corporation of Ohio
Filed Aug. 22, 1966, Ser. No. 573,969
Int. Cl. C03b 23/02
U.S. Cl. 65—107                        8 Claims

ABSTRACT OF THE DISCLOSURE

A method of bending glass sheets by utilizing inertial and gravitational forces. A flat sheet of glass, heated to bending temperature, is supported horizontally above a mold having a shaping surface corresponding in curvature to the sheet when bent. The mold is accelerated upward to lift the sheet bodily, whereupon the sheet settles into contact with the shaping surface of the mold under the influence of forces resulting from the inertia of the sheet and from gravity.

---

The present invention relates to the production of curved glass sheets and more particularly to an improved method of bending glass sheets.

Curved sheets of glass are widely used as glazing closures for vehicles, such as automobiles or the like. To be suitable for such application, the curved sheets should be bent to precisely defined curvatures dictated by the overall styling of vehicles and the manner of mounting the sheet in the opening. At the same time, it is important that the sheets meet rather stringent optical requirements and more particularly that the viewing area of the window or light be free of optical defects which would tend to interfere with the clear viewing of an object through the window. Further, glass sheets intended for use as glazing closures in vehicles are usually subjected to a heat treating process to either anneal or temper the glass, thereby altering its physical characteristics.

In general, the commercial production of curved glass sheets of the above character includes heating the sheets to the softening point of the glass, bending the heated sheets to the desired curvature and thereafter cooling the sheets in a controlled manner to a temperature below the annealing range of the glass.

When being produced in large quantities, the sheets are heated, bent and cooled in a substantially continuous process while being moved successively along a predetermined path through a heating area, a bending area and a cooling area. By using this process, the heat imparted to the sheet to bring it to proper bending temperature, is utilized in the heat treating process.

The primary object of the present invention is to provide an improved method for producing curved, glass sheets having precisely defined curvatures and improved optical properties.

Another object of the invention is to provide an improved method of bending glass sheets wherein the sheet is bent into conformity with the shaping surface of a mold by creating inertial forces by accelerating the sheet bodily with a shaping surface.

A further object of the invention is to bend a glass sheet into conformity with the shaping surface of the mold by inertial and gravitational forces and thereafter set the curvature of the sheet without producing optical defects in the finished sheet.

A further object of the invention is to provide a method of bending glass sheets which produces additional inertial forces on the sheet after it has been lifted above the supporting plane by reciprocating or vibrating the shaping surfaces to force the portions of the sheet which have not been completely bent into conformity with the shaping surface.

A still further object of the invention is to provide improved apparatus for bending glass sheets including a bending mold having a concavely curved shaping surface and adapted to shape a heated glass sheet by imposing the combined forces of inertia and gravity thereupon.

Other objects and advantages of the invention will become more apparent during the course of the following description when read in connection with the accompanying drawings.

In the drawings, wherein like numerals are employed to designate like parts throughout the same:

FIG. 1 is a side elevational view of a bending and tempering apparatus with which the improved process of the invention may be performed;

FIG. 2 is a transverse sectional view taken along lines 2—2 of FIG. 1;

Figure 3:
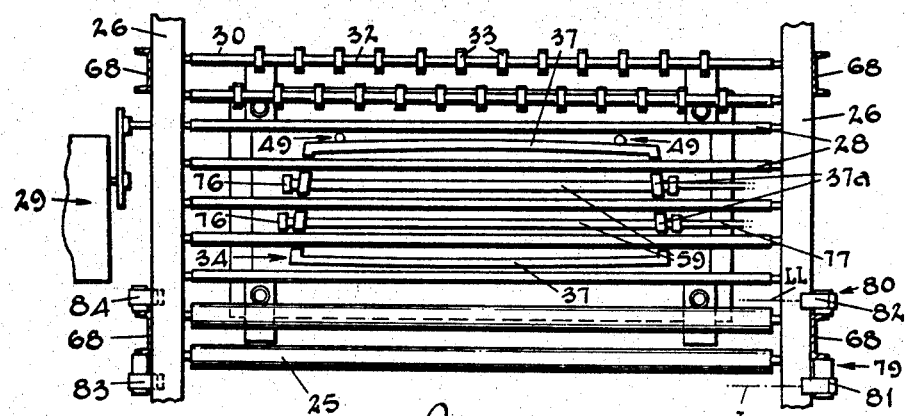
FIG. 3 is a fragmentary plan view of the bending means and the conveyor shown in FIG. 1.
Figure 4:
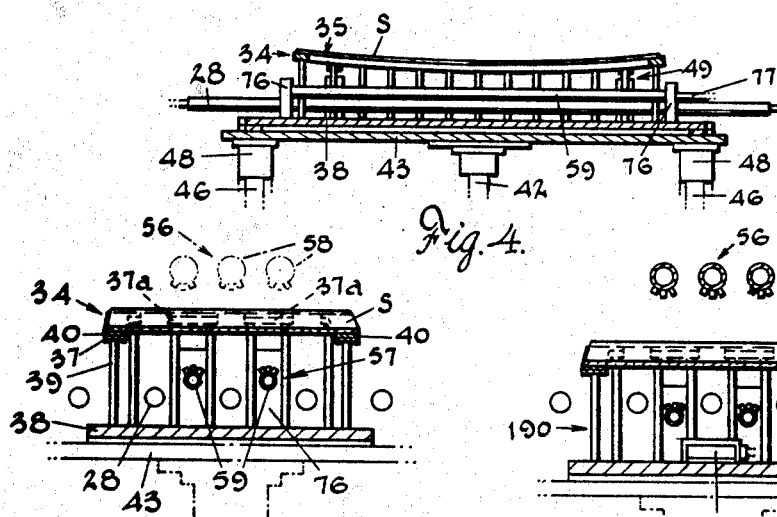
FIG. 4 is a transverse vertical sectional view showing the bending means in raised position and a bent glass sheet supported thereon.

In conventional glass bending operations, to avoid marring the surfaces of glass sheets, so-called outline or ring-type bending molds are commonly used. These molds have a contoured shaping surface defining the curvature to which the sheet is to be bent which surface contacts only the marginal portions of the bent sheet.

In using these molds the glass is first heated to a softened condition and then the sheet is bent into contact with the shaping surface. The force bending the sheet onto the mold may be applied through the utilization of a pressing member which contacts the opposite surfaces of the sheet and pushes it into the bent shape or may be a gravitational force causing the sheet to sag onto the shaping surface.

In the press bending operation, care must be exercised to avoid distorting the sheets by the application of the physical forces thereagainst. In the gravity bending operation, the sheets are not restrained in any way whereby they readily yield to the force of gravity and thus are not usually distorted by this bending force. However, with the gravity process, very close control of the heating of the sheet and the duration of this heating is required to insure that the margins of the sheet will sag into exact conformity with the shaping surface around its entire periphery and that those portions of the sheet located within the ring defined by the shaping surface will assume the proper curvature.

Further in this connection, in gravity bending on outline type bending molds, the sheet is supported over the shaping surface while being heated to the softening point of the glass. Due to the distribution of the weight of the sheet, not all areas of the sheet sag at the same rate.

Thus, the process should be controlled so that sufficient time is allotted for all areas of the sheet to sag into registry with the shaping surface and the heated atmosphere should be regulated so that the innermost portions of the sheet do not overbend or sag below the outline shaping surface. As is apparent, the longer it takes for the entire periphery of the sheet to be brought into proper registry with the shaping surface, the greater the tendency for the innermost portions of the sheet to be bent beyond the curvature defined by the shaping surface.

In accordance with the present invention, the sheets are bent in a comparatively short period of time to precisely defined curvatures by accelerating the sheet through a preselected distance thereby utilizing the forces resulting from the inertia of the sheet to bend the glass. Broadly stated then, the invention contemplates supporting a heated sheet in proper bending relation to the shaping surface of a mold and then accelerating the sheet and the mold bodily in a direction opposite the direction in which the sheet is to bend whereby an inertial force is exerted against the glass forcing it into registry with the shaping surfaces. As will be apparent the magnitude of the force exerted against the glass is a function of the acceleration of the glass and therefore the magnitude of the force can be readily controlled.

More particularly, in accordance with the invention, a combined gravitational and inertial force is utilized to effect the bending by lifting the sheet on the shaping surface of a mold out of a substantially horizontal support plane thereby accelerating it vertically resulting in the combined forces of gravity and inertia acting against the glass.

Referring now to the drawings, there is shown a suitable apparatus for carrying out the novel method of the invention. In the illustrated embodiment the apparatus is designed for the bending and tempering of glass sheets. Thus, after being bent, the sheets are subjected to rapid chilling which, as is well known, tempers the glass thereby increasing its physical strength and resistance to damage. In addition, the tempering of glass modifies its breaking characteristics rendering it far safer for use in certain applications, such as for use as vehicle windows. Bent, tempered sheets of this character are commonly used today as backlights and side lights in modern day automobiles.

The apparatus includes a conveyor system A operable to carry glass sheets S, along a predetermined substantially horizontal path, through an area B having a furnace 20 for heating the sheets to bending temperature, a bending area C having means 21 for bending the heated sheets to the desired curvature and a tempering area D having quenching means 22 for rapidly reducing the temperature of the sheets to produce the desired temper therein.

In the present instance, the glass sheets S are heated in the furnace 20 which is of the tunnel-type and has an elongated heating chamber 23, defined by refractory walls and heated by suitable burners or equivalent heating devices 24. The flat glass sheets to be heated are advanced through the heating chamber by a conveyor comprising a plurality of spaced rolls 25, which form a part of the conveyor system A, extending transversely across the chamber 23 with their opposite ends journaled on rails 26 extending along the side walls of the furnace. The conveyor rolls 25 are suitably powered to move the sheets thereon through the heating chamber where they are heated to substantially their bending temperature.

Upon emerging from an opening 27 at the exit end of the furnace, the heated sheets are received on a second conveyor consisting of a plurality of spaced rolls 28, which are also part of the conveyor system A and are suitably journaled on the rails 26 extending longitudinally on opposite sides of the bending area. As shown in FIG. 3, the rolls 28 are smaller in diameter than the rolls 25 to provide a larger space between adjacent rolls, for a purpose to be described later. The heated sheets are moved along the path by the conveyor rolls 28, driven by a power source 29 (FIG. 3), into the bending area C where they are formed to the desired curvature by the bending means 21.

After being bent, the sheets continue along the path onto a third conveyor consisting of a plurality of spaced rolls 30, also a part of the conveyor system A, which are driven in common by a power source (not shown) to move the sheets through the tempering area D past the quenching means 22. In the illustrative embodiment, the quenching means 22 include blast heads 31, disposed above and below the path, operable to direct opposed blasts of cooling fluid, such as air, toward and against the opposed surfaces of the sheets moving along the path.

In order to have a major portion of the lower surface of the sheet in direct communication with the cooling fluid, the conveyor rolls in the tempering area each include a shaft 32 (FIG. 3) rotatable about a parallel axis extending transversely of the path of the moving sheet. Each shaft has enlarged circular discs 33 axially spaced apart along the shaft and fixedly secured thereto, with the discs being covered by a suitable heat-resistant refractory material.

The spaced discs on each shaft allow the major area of the lower surface of the sheet to be in direct communication with the cooling medium directed thereagainst and also reduce the area of contact of the discs with the sheet surface thereby minimizing scratching and marring of the sheet surface. The opposite ends of the shafts are journaled on the rails 26 extending on opposite sides of the tempering area and are rotatably driven in unison by a power source (not shown) to move the sheets through the tempering area.

In the preferred embodiment of the illustrated apparatus, the bending means 21 includes a mold 34 (FIG. 2) having a shaping surface 35 and means 36 for moving the mold vertically of the path of the moving sheet. The mold 34 is an open ring-type structure which engages only the marginal portions of the sheet to avoid marring those portions of the surface of the sheet within the viewing area of the finished window.

For this purpose, the mold consists of a plurality of bars 37, preferably made of metal or similar material able to withstand the high temperatures to which the mold is subjected. The bars are mounted on a base 38 and arranged in a quadrangle conforming in plan to the outline of the glass sheets, with the bars held in fixed position by spaced rods 39 fixed to the base 38. The bars 37 have their upwardly directed surfaces positioned to form the generally concave shaping surface 35.

Since the mold must lift the sheets above the conveyor, it is preferable to construct the mold so as to be capable of passing between the adjacent conveyor rolls 28 and lift the sheet above the path. For this purpose, the longitudinally extending sides or bars of the ring are divided into short segments 37a arranged end-to-end with their adjacent ends spaced apart a sufficient distance so that the segments may pass between the adjacent conveyor rolls 28.

Ordinarily the metallic materials have a tendency to fuse to glass when the latter is heated to the elevated temperature necessary for bending which will produce defects in the finished window. To avoid this, the sheet contacting surface of the mold, or more particularly the upper surfaces of the bars 37 and 37a are provided with a cover 40 (FIG. 5) of refractory material which will not fuse to the heated sheets.

The moving means 36 for raising and lowering the mold may be a variety of different types of mechanisms. In the illustrative embodiment, a fluid cylinder and piston rod is shown. The fluid cylinder 41 (FIGS. 1 and 2) slidingly receives a piston rod 42 having its upper free end rigidly secured to a horizontal plate 43 which carries the base 38 of the mold. The cylinder is provided with upper and lower ports to which are connected fluid conduits 44 and 45 for raising and lowering the plate 43 and the mold 34. The plate 43 and mold 34 are guided for vertical movement by rods 46 located at each of the corners of the plate 43. The rods are each supported in a vertical position by a structural member 47 rigidly secured to the floor below the bending area and the plate 43 is guided for vertical movement along the respective rods by collars 48 fixed to one of the surfaces of the plate.

In order to ensure that the respective sheets are properly located relative to the shaping surface of the mold, locating devices 49 are disposed adjacent one edge of the mold and are spaced transversely of the path of the moving sheet with a portion thereof adapted to be moved into and out of the path and be engaged by the leading edge of the moving sheet.

Figure 7:
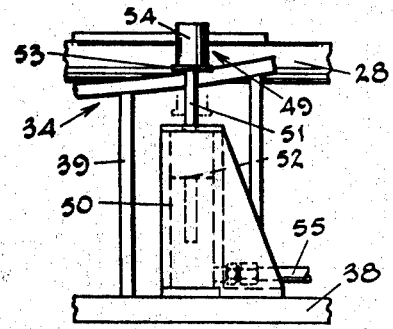
FIG. 7 is an enlarged fragmentary side elevational view showing stop means located in the path of the moving sheet.
Figure 8:
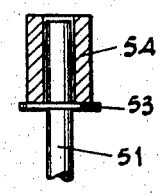
FIG. 8 is a fragmentary sectional view of details of the stop means shown in FIG. 7.

As shown in FIGS. 7 and 8, the locating devices 49 each include a fluid cylinder 50, supported on the base 38 of the mold, which slidably receives a piston rod 51 therein. The rod is provided with an enlarged piston 52 adjacent its lower end which is guided for vertical movement within the cylinder. The upper end of the rod has a collar 53 fixed thereon at a point spaced from the free end thereof. A sleeve 54, preferably formed of a phenolite material, is loosely fitted on the rod and supported by the collar. The sleeve or stop is capable of rotating about the rod when any relative movement is required between the leading edge of the sheet and the locating device. This will prevent any scratching of the edge of the sheet when there is relative movement between the sheet and the stop.

As can readily be appreciated, with reference to FIG. 7, when fluid pressure, such as air, is applied to the lower end of the cylinder 50 through conduit 55, the rod 51 and stop 54 will be raised and located in the path of the moving sheet and when the pressure is relieved, the free end of the rod and the stop will drop below the path of the sheet by gravity acting upon the enlarged piston.

The sheet curvature is set while being supported on the shaping surface, immediately after being bent, by directing cooling gases against the opposite major surfaces to slightly reduce its temperature and render the sheet more rigid before it is returned to the conveyor. Herein, the cooling gases are directed toward the opposed surfaces by cooling means 56 and 57 spaced from each of the major surfaces. The cooling means comprises tubular members 58 and 59, respectively, disposed adjacent the major glass surfaces with openings 60 formed in the members directed toward the sheet.

Figure 5:
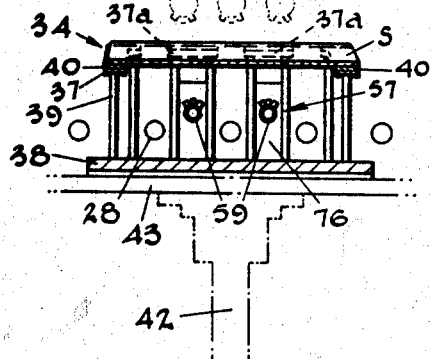
FIG. 5 is a longitudinal sectional view of the bending means in raised position and a bent glass sheet supported thereon.

The upper cooling means 56 may be fixed in position above the path and in alignment with the mold. However, to provide more open area above the mold, the upper cooling means is shown as being movable from an out-of-way position (FIG. 1) to an operative position (FIG. 5).

As best shown in FIGS. 1 and 2, the tubular members 58 of the upper cooling means 56 are normally disposed in the out-of-way position on one side of the bending area. The tubular members extend transversely across the path and have their opposite ends connected to ducts 61 communicating with each of the members. The tubular members and ducts are carried by a pair of arms 62 connected to the respective ducts with their opposite ends mounted on a shaft 63. The shaft 63 is journaled in bearings 64 carried by beams 65 extending longitudinally of the path and supported on transversely extending beams 66 of a framework 67 mounted on columns 68.

The tubular members 58 are moved from the out-of-way position to a position directly above the mold by actuator means, such as a fluid cylinder 69 supported on a base 70 carried by a beam 71 of the framework 67. The fluid cylinder 69 slidably receives a piston rod 72 having its free end connected to one of the arms 62 intermediate its ends thereof. Therefore, when fluid pressure is applied to the respective ends of the fluid cylinder, the tubular members will be moved between the position shown in FIG. 1 and the position shown in FIG. 5.

Figure 6:
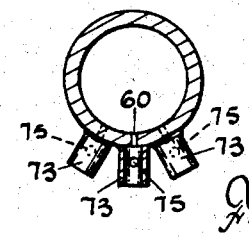
FIG. 6 is an enlarged sectional view of one of the elements of the cooling means.

Each tubular member 58 is curved to substantially conform to the curvature of the bent sheet (FIG. 2) and the openings 60 are arranged in radially spaced rows (FIG. 6) with the adjacent rows staggered with respect to one another so that the cooling gases are directed across the entire upper surface of the sheet. To ensure that the cooling gases, such as air, are directed to different areas of the sheet, each opening is provided with a tubular extension 73.

Pressurized air is supplied to the tubular members 58 through a conduit 74 (FIG. 1) connected to one of the arms 62 which is hollow and communicates with the associated duct 61. The pressurized air is directed through the tubular members to flow in streams through the extensions 73 and impinge on the sheet surface. If desired, the extensions may include aspirating orifices 75 (FIG. 6) adjacent the tubular members to allow ambient gases, such as air, to be drawn into the streams and thereby increase the volume of cooling fluid impinging on the sheet surface.

The lower tubular members 59 are similar in structure to the tubular members 58 and are supported on the base 38 of the mold 34 by brackets 76. Although any number of tubular members may be used for cooling the lower surface, as well as the upper surface, two such members are shown for the lower cooling means, by way of example, and three members for the upper cooling means with the members held in spaced parallel relation to each other. The lower tubular members are located on the base so as to be capable of being raised between a spaced pair of conveyor rolls 28 when the mold is moved above the path of the moving sheet. The pressurized air is supplied to each of the lower tubular members from a source (not shown) through conduits 77 connected to the respective tubular members. If desired, the lower tubular members may also be curved to conform to the curvature of the sheet when bent.

The preferred manner of carrying out the method, according to the invention, is to load flat glass sheets S onto the conveyor rolls 25 at the entrance end (not shown) of the furnace 20, to be moved through the heating chamber 23 wherein the sheets are heated to bending temperature. Each heated sheet passes through the opening 27 and is received on the conveyor rolls 28 to be moved into the bending area. Each sheet is accurately located above the bending means 21 when the leading edge engages the stops 54 located in the path of the moving sheet. Fluid pressure is then applied to the lower end of the fluid cylinder 41 to rapidly move the sheet above the supporting plane, formed by the conveyor rolls 28, whereby an inertial force bends the sheet into conformity with the shaping surface of the mold. Immediately after being shaped to the curvature of the shaping surface of the mold, air is directed against the opposed major surfaces of the sheet through the tubular members 58 and 59. After the sheet is sufficiently cooled to set the curvature thereof, the mold is lowered to return the sheet to the supporting plane to be moved by the conveyor rolls 28 from the bending area into and through the tempering area wherein the opposed major surfaces are quenched with air from the blastheads 31 to produce the desired temper therein.

Although, according to the invention, it is only necessary to raise the mold a sufficient distance to lift the sheet off the supporting plane, as herein disclosed, the sheet is raised a considerable distance above the supporting plane to a position shown in FIG. 5 so that the lower tubular members are located slightly above the conveyor rolls and the major surfaces of the sheet are equally spaced from the adjacent tubular members.

To ensure that the temperature of the partially cooled sheets will not decrease below that necessary for proper tempering after the sheet is returned to the conveyor, it is desirable to have the sheets carried from the bending area by the conveyor rolls 28 at a higher rate of speed than the speed at which the sheets are moved through the furnace into the bending area and above the mold.

Figure 9:
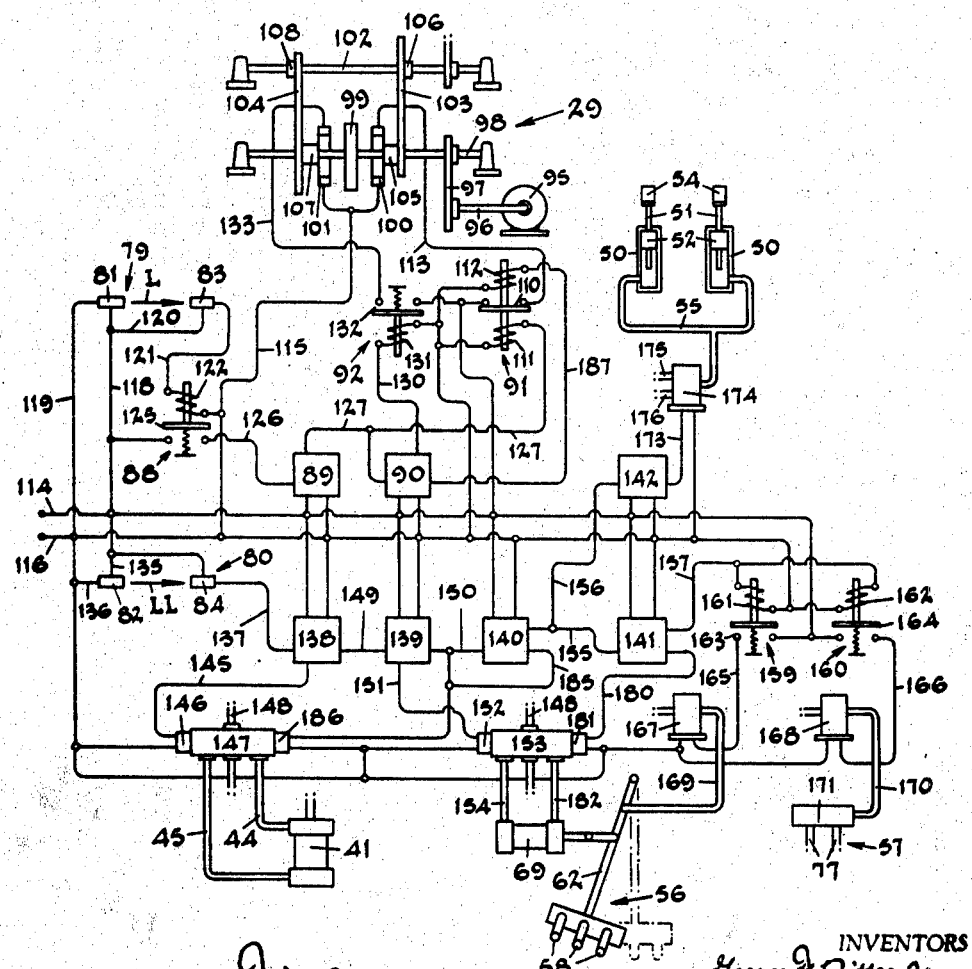
FIG. 9 is a diagrammatical view of a control system for automatically controlling the various phases of the bending and cooling operation of the apparatus shown in FIG. 1.

As shown in FIGS. 1 and 2, each glass sheet successively entering the bending area C produces the activation of an electric system which, in one instance, controls the rate of speed at which the sheet enters and leaves the actual bending area and, secondly, the sequentially occurring phases of bending and initially cooling the sheet. Thus, two sensing devices 79 and 80 are arranged on transversely disposed columns 68 with the light sources 81 and 82 thereof located at one side of the path of sheet movement. Light source 81 directs a beam of light L transversely to a photoelectric cell 83 with said beam being intercepted by a sheet approaching the bending area to produce selected variations in the rate of speed at which the conveyor rolls 28 are driven. Then, as the sheet enters the bending area, it interrupts the light beam LL between source 82 and cell 84 to put into operation the electrical components which control the bending and cooling of the sheet. For these purposes, the sensing devices 79 and 80 are illustrated in FIG. 9 in connection with a typical electrical system with the device 79 being in circuit with a relay switch (RS) 88 which activates a timer relay (TR) 89. This timer and an associated timing relay (TR) 90 produce the operation of relay switches 91 and 92 that control the variable rates of speed at which the power source 29 is driven.

As herein disclosed, the power source 29 includes a motor 95 the shaft 96 of which by belt 97 is coupled to a first or input shaft 98 journaled at its ends in suitable bearings. A driving or armature member 99 is keyed to shaft 98 and is adapted to be selectively engaged by either of two driven or field members 100 and 101 freely rotatable on shaft 98. These driven members are coupled to a second or output shaft 102, journaled at its ends in suitable bearings, by belt drives 103 and 104 entrained about pairs of pulleys 105–106 and 107–108 respectively. As herein provided, pulley 105 is an integral component of field member 100 and its proportional ratio to pulley 106 is such that belt 103 will drive conveyor rolls 28 through shaft 102 at a rate of speed comparable to the speed at which rolls 25 are operated. On the other hand, pulley 107 is related to field member 101 and its proportional ratio to pulley 108 is selected to cause belt 104 to operate shaft 102 at a relatively higher rate of speed while the conveyor rolls 28 are removing a bent sheet from the bending area C into the tempering area D. As presently shown, the pair of contacts 110 of RS 91, equipped with opposed solenoids 111 and 112, complete the circuit of line 113 from source line 114 through field member 100 and armature 99 and thence by line 115 to source line 116.

The circuit of light source 81 is completed by lines 118 and 119 from source lines 114 and 116 while one side of cell 83 is connected by line 120 to source 114. Now, when the leading edge of a sheet intercepts the beam L, the cell 83 is permitted to make a circuit by line 121 through solenoid 122 of RS 88 to source line 116. The pair of contacts 125, normally spring-biased to an open position, are thus engaged to complete an activating circuit to TR 89 by way of line 126. This timer, in series with source lines 114 and 116, is adjusted to monitor an interval of time during which the sheet is carried to its located position above the mold 34 and is raised from the conveyor rolls 28 as will shortly be described in connection with the operation of sensing device 76. TR 89 then completes a circuit by line 127 to activate TR 90 and simultaneously a circuit through solenoid 111 of RS 91 to source 116 thereby disengaging contacts 110 to de-energize field member 100. TR 90, in series with source lines 114 and 116, is adjusted to initially complete a circuit by line 130 through the solenoid 131 of RS 92 to source line 116. The pair of contacts 132, normally spring-biased to the open position, are thereby engaged to complete a circuit from source line 114 by line 133 through field member 101 and armature 99 and line 115 to source line 116. This will drive belt 104 through pulley 107 to operate pulley 108 and shaft 102 at the selected higher rate of speed. The TR 90 then monitors a time interval during which the sheet is bent, cooled and lowered onto the conveyor rolls 28 and carried onto the conveyor rolls 30 in the tempering area D.

While this control sequence of power source 29 is being carried out, the leading edge of the sheet intercepts beam LL which is created by the source 82 connected to source lines 114 and 116 by lines 135 and 136. Interception of this beam permits cell 84 to complete a circuit from source line 114 by way of line 137 to produce activation of TR 138 which is basically instrumental in the sequential activation of TR 139, TR 140, TR 141 and TR 142, all being in series with source lines 114 and 116. Thus, TR 138 completes a circuit by line 145 through end 146 of a four-way valve 147 to source line 116 to connect fluid supply pipe 148 to pipe 45 connecting to the lower end of cylinder 41. This will raise the mold 34 thereby lifting the sheet from conveyor rolls 28 and bending the same. The timer thus establishes the relatively short interval of time for the bending operation before energizing TR 139 through line 149.

Timing relay 139 energizes TR 140 by line 150 but initially completes the circuit of line 151 through end 152 of a four-way valve 153 to source line 116 thereby connecting fluid supply pipe 148 to the rear end of cylinder 69 by pipe 154. This swings the upper cooling means 56 into operable position above the bent sheet, as indicated in broken line. Line 150 activates TR 140 to perform two functions, the first of which energizes TR 141 and TR 142 by circuit lines 155 and 156, respectively, and secondly, after a timed interval, produces reversal of valve 147. TR 141 likewise carries out two functions whereby a line circuit 157 is made to RS 159 and 160 and after a monitored interval of time a circuit is made to reverse valve 153. Thus, line 157 is completely through the solenoids 161 and 162 of RS 159 and 160, respectively, to source line 116. The related pairs of contacts 163 and 164, normally spring-biased to an open position, are then engaged to complete similar lines 165 and 166 to control valves 167 and 168 respectively. Valve 167 connects a source of air through pipe 169 to conduit 70 of the tubular members 58 of cooling means 56 while valve 168 communicates by pipe 170 with a manifold 171 which distributes air to the lower tubular members 59 by conduits 74. The duration of cooling of the surfaces of the sheet is determined by the TR 141 and consequently, when the first function of the same becomes inactive, the circuit of line 157 will be opened permitting the pairs of contacts 163 and 164 to be disengaged.

The circuit of line 156 from TR 140 activates the TR 142 that is adjusted to monitor the length of time after the locator stops 54 are lowered until they can again be raised to operative position. Therefore, TR 142 initially completes a circuit by line 173 through valve 174 thereby reversing the connection of pipe 55 from a supply pipe 175 to exhaust 176. This permits the weight of pistons 52 to lower the stops by gravity.

TR 141 now performs its second function to complete a line 180 through the side 181 of the valve 153, thereby connecting supply pipe 148 to the rod end of cylinder 69 through pipe 182. This will swing the upper cooling means 56 to its inoperative position. Continuing, the aforementioned second function of TR 140 serves to complete the circuit of a line 185 through end 186 of valve 147 to source line 116 thereby providing fluid pressure from pipe 148 to the upper end of cylinder 41 by way of pipe 44 and lowering the mold 34 to deposit the bent sheet upon the conveyor rolls 28. As noted above, TR 142 is still functioning to connect pipe 55 to exhaust 176 through valve 174 whereby the locator stops 54 will remain in their lowered positions and thus beneath the path of the sheet on rolls 28.

Of course, upon completion of a bending operation, the light beams from the sources 81 and 82 will affect their associated photoelectric cells 83 and 84 to render the lines 121 and 137 inactive. However, until the sheet is bodily received on the rolls 30, TR 90 functions to maintain line 130 thereby holding the contacts 132 of RS 92 engaged. At the end of this interval, the timing relay opens line 130 to mainly de-energize the field member 101 while completing a line 187 through the opposed solenoid 112 of RS 91 to source line 116. This will reengage pair of contacts 110 to restore the circuit of line 113 to the opposite field member 100 and armature 99 thereby reducing the speed of shaft 102 so that the conveyor rolls 28 will again be operated at the speed of rolls 25.

The preferred process according to the invention, has been tested in a continuous producion operation for bending glass sheets successively to the desired curvature. In the production run, glass sheets having an approximate size of 17" x 55" were bent to have a rise of 2" of the outer edges with respect to the center portion. The glass sheets were successively moved, one by one, through the furnace where they were heated to approximately 1180° F. and moved into the bending area above the mold. The mold was raised at a speed of approximately 35" per second, and, after the mold had been rapidly moved above the conveyor and the heated glass sheet forced into conformity with the shaping surface, the opposed surfaces of the sheet were cooled for a period of 3 to 4 seconds. Thereafter, the sheet was returned to the conveyor rolls and moved into and through the tempering area.

The production run, utilizing the above limitations, produced a glass sheet bent to a catenary having a maximum overbend, or crossbend, of .090" using standard thickness (.235") glass and the normal cross bend ranged from 0 to approximately 0.045".

As can readily be appreciated, the improved bending process produces extremely accurately defined curvatures in the bent sheets using glass sheets having a standard thickness, as noted above, rather than a special glass sheet being slightly thicker on the order of .255", which was heretofore required to obtain a maximum overbend of ¼".

The above process has proven satisfactory in bending glass sheets to a generally catenary curve having a relatively large radius of curvature. However, it has been determined that the maximum rise of the outer edges which can be obtained by this process has been five inches on a sheet having a minimum length of 48 inches. Furthermore, in bending glass sheets to a non-catenary curve, the glass sheet may not bend into conformity with the entire shaping surface of the mold.

Therefore, according to another aspect of the invention, the mold is moved in alternate directions substantially perpendicular to the shaping surface to produce additional inertial forces after the sheet has been lifted off the supporting plane and before the sheet is set in curvature to force the non-conforming portion of the sheet into conformity with the shaping surface. The alternating movement may be produced by reciprocating or vibrating the mold or more particularly the shaping surface.

The reciprocating action may be accomplished by rapidly alternating the fluid pressure to opposite ends of the fluid cylinder 41. Preferably the fluid pressure is applied in such a manner as to raise the mold shaping surface more rapidly than it is lowered during the reciprocating motion so that large inertial forces may be produced during the upward stroke while the downward stroke is slow enough to retain the sheet on the shaping surface at all times.

Figure 10:
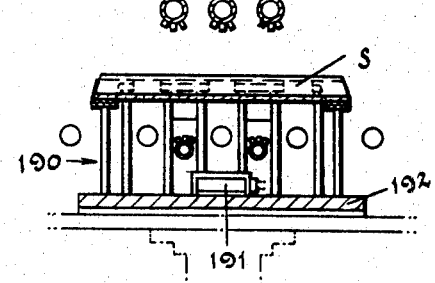
FIG. 10 is a modified form of bending apparatus for performing a modified process of the invention.

The vibratory motion may be applied to the shaping surface as shown in FIG. 10. In the illustrated bending apparatus, the bending mold 190 is identical in construction to the mold 34 shown in the preferred apparatus and a vibration generator 191 mounted on the base 192 of the mold. The vibration generator is preferably adjustable to vary the cycle and/or magnitude of vibration produced. Of course, both the cycle and magnitude of vibrations desired will be dependent upon many factors such as the nature, location and amount of bend required after the sheet has been lifted off the supporting plane and forced into partial conformity with the shaping surface. After the entire sheet is in conformity with the shaping surface, the opposed surfaces are cooled by air flowing through the tubular members 58 and 59.

Although the vibrating generator has been illustratively shown as being mounted on the base of the mold it would be readily apparent and within the spirit of the invention to mount one or more generators on the bars 37 forming the shaping surface or at any other point on the mold which would prove desirable to produce the desired vibration at any given point.

As can readily be appreciated, the novel bending process is capable of rapidly bending glass sheets on a ring type shaping surface to exact curvatures to thereby produce bent sheets having little or no optical distortion.

It is to be understood that the form of the invention herewith described is to be taken as an illustrative embodiment only of the same, and that various procedural changes may be resorted to without departing from the spirit of the invention.

We claim:

1. In a method of bending glass sheets, the steps of heating a sheet to the softening point of the glass, supporting the heated sheet in a substantially horizontal plane and in bending relation to a contoured shaping surface disposed below said plane and shaped to the curvature of the sheet when bent, and accelerating said shaping surface vertically through said plane to lift said sheet from said plane, said acceleration being sufficient to create an inertial force which when combined with the force of gravity causes said sheet to settle onto said shaping surface.

2. In a method of bending glass sheets as claimed in claim 1, reciprocating said shaping surface up and down to repeatedly subject said sheet to inertial forces, after said shaping surface is lifted above said plane.

3. In a method of bending glass sheets as defined in claim 1, vibrating said shaping surface while the sheet is supported thereon, after said shaping surface is lifted above said plane.

4. In a method of bending glass sheets as claimed in claim 1, wherein after being bent the shaping surface is lowered below said plane to deposit said bent sheet in said plane, cooling said sheet while it rests on said shaping surface to set the glass in the bent curvature before returning the sheet to said plane.

5. In a method of bending glass sheets as claimed in claim 4, wherein said bent sheet is cooled by directing streams of cooling fluid toward and against opposite surfaces of the bent sheet.

6. In a method of bending glass sheets, comprising supporting the sheet in a substantially horizontal position for movement along a predetermined path through a heating area and a bending area; heating the sheet to the softening point of the glass as the sheet moves through said heating area; advancing said sheet out of said heating area and into said bending area; locating the sheet in said bending area in bending relation to a contoured shaping surface formed on a bending mold disposed below said path; moving said mold vertically through said path into contact with the sheet; accelerating said mold and said sheet bodily upward, said acceleration being sufficient to cause the sheet to settle under the influence of inertial and gravitational forces into registry with said shaping surface; and thereafter returning said bent sheet to said path.

7. In a method of bending glass sheets as claimed in claim 6, wherein said bent sheet is cooled to set the glass in the desired curvature while it rests on said shaping surface and before the bent sheet is returned to said path.

8. In a method of bending glass sheets, the steps of heating a sheet to be bent to the softening point of the glass, supporting the heated sheet in bending relation to a shaping surface formed on a bending mold and conforming in curvature to the sheet when bent, accelerating said mold and said sheet bodily along a path extending perpendicular to the major surfaces of the sheet and in a direction opposite to that in which the sheet is to be bent, said acceleration being sufficient to cause said sheet to sag onto said shaping surface under the influence of a force resulting from the inertia of the sheet.

References Cited
UNITED STATES PATENTS 3,265,484    8/1966    Ritter _____ 65—104

S. LEON BASHORE, Primary Examiner

SAUL R. FRIEDMAN, Assistant Examiner

U.S. Cl. X.R.

65—106, 273, 287, 268